US012539221B2

(12) United States Patent
Unal et al.

(10) Patent No.: US 12,539,221 B2
(45) Date of Patent: Feb. 3, 2026

(54) 2 DEGREES OF FREEDOM PROSTHETIC WRIST STRUCTURE

(71) Applicant: OZYEGIN UNIVERSITESI, Istanbul (TR)

(72) Inventors: Ramazan Unal, Istanbul (TR); Ahmed Abdelrahman Ibrahim Elsayed, Khartoum (SD); Baris Baysal, Istanbul (TR)

(73) Assignee: OZYEGIN UNIVERSITESI, Istanbul (TR)

(*) Notice: Subject to any disclaimer, the term of this patent is extended or adjusted under 35 U.S.C. 154(b) by 630 days.

(21) Appl. No.: 17/922,789

(22) PCT Filed: May 3, 2021

(86) PCT No.: PCT/TR2021/050422
§ 371 (c)(1),
(2) Date: Nov. 2, 2022

(87) PCT Pub. No.: WO2021/225549
PCT Pub. Date: Nov. 11, 2021

(65) Prior Publication Data
US 2023/0157847 A1 May 25, 2023

(30) Foreign Application Priority Data
May 4, 2020 (TR) .................. 2020/06913

(51) Int. Cl.
*A61F 2/58* (2006.01)
*A61F 2/50* (2006.01)

(52) U.S. Cl.
CPC .......... *A61F 2/58* (2013.01); *A61F 2002/503* (2013.01); *A61F 2002/5093* (2013.01)

(58) Field of Classification Search
CPC .. A61F 2/54; A61F 2/582; A61F 2/583; A61F 2/585; A61F 2/172
(Continued)

(56) References Cited

U.S. PATENT DOCUMENTS

| 4,067,070 A | 1/1978 | Seamone et al. |
| 5,163,966 A | 11/1992 | Norton et al. |

(Continued)

FOREIGN PATENT DOCUMENTS

| ES | 2695502 A1 | 1/2019 |
| KR | 19990085553 A | 12/1999 |

*Primary Examiner* — Nitin Patel
(74) *Attorney, Agent, or Firm* — Bayramoglu Law Offices LLC

(57) ABSTRACT

A prosthetic wrist unit providing a connection between the arm and a hand mechanism, comprising a wrist base unit with at least one connection slot into which the hand mechanism is to be inserted and at least one connecting piece enabling the rotational movement of the prosthetic wrist unit; a joint including a joint seat and a joint body; a locking mechanism comprising a locking mechanism opening into which the joint body is inserted and enabling the prosthetic wrist unit to operate in two positions, i.e., fixed or movable; an arm coupling unit into which the joint and the locking mechanism are inserted and which restricts the movement of the joint and the locking mechanism; and at least one tendon ensuring the joint stiffness of the prosthetic wrist unit.

17 Claims, 6 Drawing Sheets

(58) Field of Classification Search
USPC .......................................................... 623/63
See application file for complete search history.

(56) References Cited

U.S. PATENT DOCUMENTS

| | | | | |
|---|---|---|---|---|
| 5,800,572 | A * | 9/1998 | Loveall | A61F 2/583 |
| | | | | 623/33 |
| 7,048,768 | B1 | 5/2006 | Rouse et al. | |
| 9,839,534 | B2 * | 12/2017 | Lipsey | A61F 2/582 |
| 11,083,601 | B1 * | 8/2021 | Leonard | A61F 2/585 |
| 2009/0326677 | A1 | 12/2009 | Phillips et al. | |
| 2019/0175363 | A1 * | 6/2019 | Wu | A61F 2/585 |
| 2019/0298553 | A1 * | 10/2019 | Gibbard | A61F 2/7812 |
| 2021/0386562 | A1 * | 12/2021 | Zuniga | A61F 2/72 |
| 2023/0022882 | A1 * | 1/2023 | Byrne | A61F 2/583 |
| 2025/0186228 | A1 * | 6/2025 | Agarwal | A61F 2/54 |

* cited by examiner

2 DEGREES OF FREEDOM PROSTHETIC WRIST STRUCTURE

CROSS REFERENCE TO THE RELATED APPLICATIONS

This application is the national phase entry of International Application No. PCT/TR2021/050422, filed on May 3, 2021, which is based upon and claims priority to Turkish Patent Application No. 2020/06913, filed on May 4, 2020, the entire contents of which are incorporated herein by reference.

TECHNICAL FIELD

The present invention relates to a prosthetic wrist structure that can be used with prosthetic or robotic or other rehabilitation hand devices for patients with congenital limb loss or amputation.

BACKGROUND

For people with congenital limb loss or patients who have had to lose one or more limbs due to various diseases or accidents, prosthesis technology is one of the most important technologies that enable the patient to maintain a functional life close to normal.

In the prior art, there are a number of prosthetic devices for amputees who have lost one or both hands or arms. The devices are varied according to the needs of the patients as prosthetic devices controlled by the body force, and prosthetic devices that are activated or supported by electrical, myoelectric and pneumatic means.

In the prior art, there are available quite few prosthetic wrist structures. Most upper extremity prostheses are designed and manufactured as a whole hand and wrist.

Most of the wrist prostheses that are currently used offer limited ability to grasp, properly position and move the prosthetic hand devices that are traditionally controlled in an active and passive manner.

Another disadvantage of the wrist prostheses in the prior art is that the mechanical prostheses are bulky and heavy. While the patient's coping with limb loss requires an adaptation process on its own, it is very difficult for the patient to regain their functions and continue their daily life because the prostheses are heavy when used for a long time.

One of the important deficiencies of the prior art wrist prostheses is that they are unable to provide a solution to the necessity for frequent replacement of the prostheses in accordance with the changing body sizes of the pediatric patients in their developmental ages. Since the currently used prosthetic devices cost serious amounts, there is still a need for a prosthetic wrist that can be renewed frequently, has an easily adaptable mechanism, and does not require serious processes and costs of production.

In the technical field, U.S. Pat. No. 5,163,966 discloses a prosthetic limb having a semicircular means for gripping and holding a bar or tubular element.

In the technical field, patent application numbered US2009326677 discloses a 2 degrees of freedom mechanical wrist prosthesis comprising an actuator system allowing rotation and stabilization of the wrist.

However, the inability of the wrist prostheses used in the prior art to provide solutions to the above-mentioned problems results in the need for a multi-functional, lightweight and low-cost wrist prosthesis that can be activated by the body control of the patients, and adaptable to the prosthetic or robotic or other rehabilitation hand devices.

SUMMARY

An object of the present invention is to provide a prosthetic wrist unit that can be used with prosthetic, robotic or other rehabilitation hand devices for subjects with congenital limb loss or amputation.

Another object of the invention is to provide a prosthetic wrist unit enabling that the functions of the prosthetic hand devices such as grasping, proper positioning and moving are performed in a manner close to the function of a healthy hand.

Another object of the invention is to provide a prosthetic wrist unit that allows the wrist prosthesis to be moved with 2 degrees of freedom, which is lightweight, easy to manufacture and can be replaced frequently in accordance with the changing body sizes of the user.

In order to achieve the above-mentioned objects, the invention is a prosthetic wrist unit allowing a connection between the arm and a hand mechanism, comprising a wrist base unit with at least one connection slot into which the hand mechanism is to be inserted, and at least one connecting piece enabling the rotational movement of the wrist base unit, wherein the connection slot is located at a front end part of the wrist base unit while the connecting piece is located at the other rear end part of the wrist base unit; a joint including a joint seat into which the connecting piece is inserted, and a joint body, wherein, in order for the rotational movement of the wrist base unit to take place, the joint seat is such that the connecting piece can move inside the joint seat; a locking mechanism comprising a locking mechanism opening into which the joint body is inserted and enabling the prosthetic wrist unit to operate in two positions, i.e., fixed or movable; an arm coupling unit into which the joint and the locking mechanism are inserted and which restricts the movement of the joint and the locking mechanism, wherein the arm coupling unit has a rear end into which the arm is inserted and a front end having an arm coupling unit opening into which the locking mechanism is fitted; and at least one tendon (50) ensuring the joint stiffness of the prosthetic wrist unit (1).

In order to achieve the above-mentioned objects, the invention has a form in that the connecting piece of the wrist base unit and the joint seat of the joint are capable of providing a 2 degrees of freedom wrist movement as flexion-extension and abduction-adduction.

In order to achieve the above-mentioned objects, the invention is a prosthetic wrist unit in which the wrist base unit includes a convex connecting piece.

In order to achieve the above-mentioned objects, the invention is a prosthetic wrist unit in which the joint includes a concave joint seat.

In order to achieve the above-mentioned objects, the invention is a prosthetic wrist unit in which the concave joint seat into which the convex connecting piece is inserted has a circular structure larger than the connecting piece in order to perform a circular and arcuate movement of the connecting piece.

In order to achieve the above-mentioned objects, the invention is a prosthetic wrist unit in which the arm coupling unit also comprises a one-way lock positioned on its upper surface, enabling the joint and the locking mechanism to be locked inside the arm coupling opening.

In order to achieve the above-mentioned objects, the invention is a prosthetic wrist unit in which the wrist base unit comprises at least one tendon slot through which a tendon is passed.

In order to achieve the above-mentioned objects, the invention is a prosthetic wrist unit in which the wrist base unit comprises four tendon slots, one on either side surface of the wrist base unit and one on the upper and lower surfaces on the rear end.

In order to achieve the above-mentioned objects, the invention is a prosthetic wrist unit in which the arm coupling unit comprises at least one tendon slot through which a tendon is passed.

In order to achieve the above-mentioned objects, the invention is a prosthetic wrist unit in which the amount of the joint stiffness of the prosthetic wrist unit is adjusted by means of tendons.

In order to achieve the above-mentioned objects, the invention comprises an abduction-adduction connection mechanism that is connected to the upper elbow part of the body, which allows an abduction-adduction movement of the prosthetic wrist unit by means of the tendons.

In order to achieve the above-mentioned objects, the invention comprises a flexion-extension connection mechanism connected on and over an elbow, which allows a flexion-extension movement to be performed by means of the tendons.

In order to achieve the above-mentioned objects, the invention is a prosthetic wrist unit in which the amount of tension of the tendons (50) that adjust the rigidity in the joint stiffness of the wrist unit is adjusted manually.

In order to achieve the above-mentioned objects, the invention is a prosthetic wrist unit comprising at least one actuator positioned in the arm coupling unit and automatically adjusting the tension of the tendon.

Figure 1:
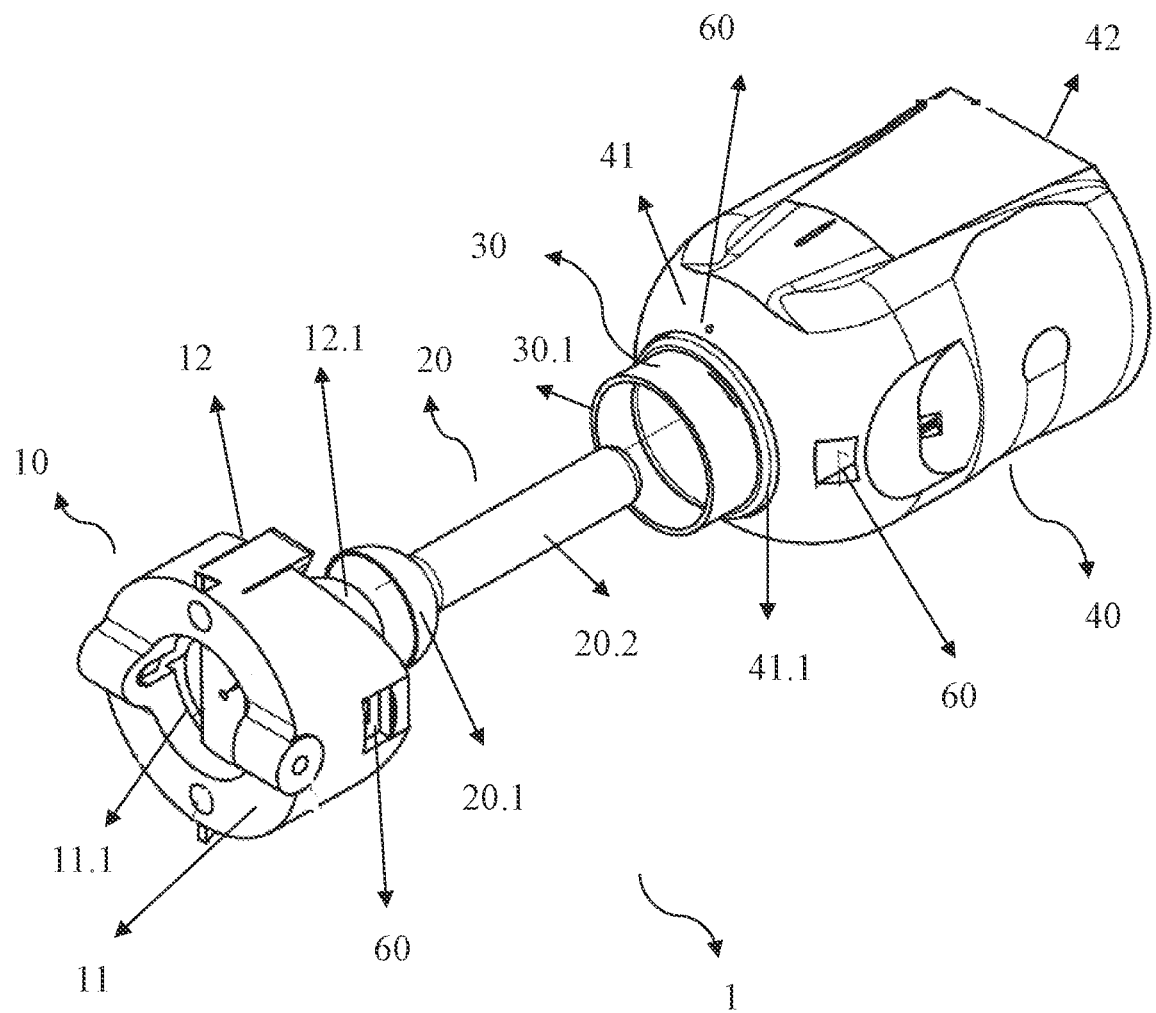
FIG. 1 is a front exploded view of the elements forming the prosthetic wrist unit.
Figure 2:
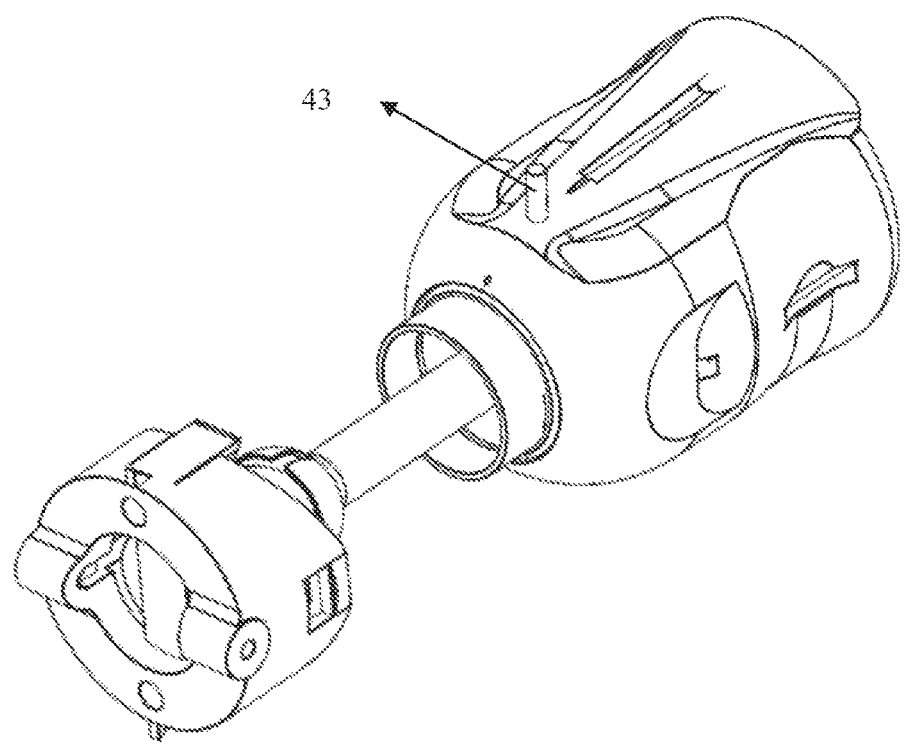
FIG. 2 is a view of another embodiment of the prosthetic wrist unit.
Figure 3:
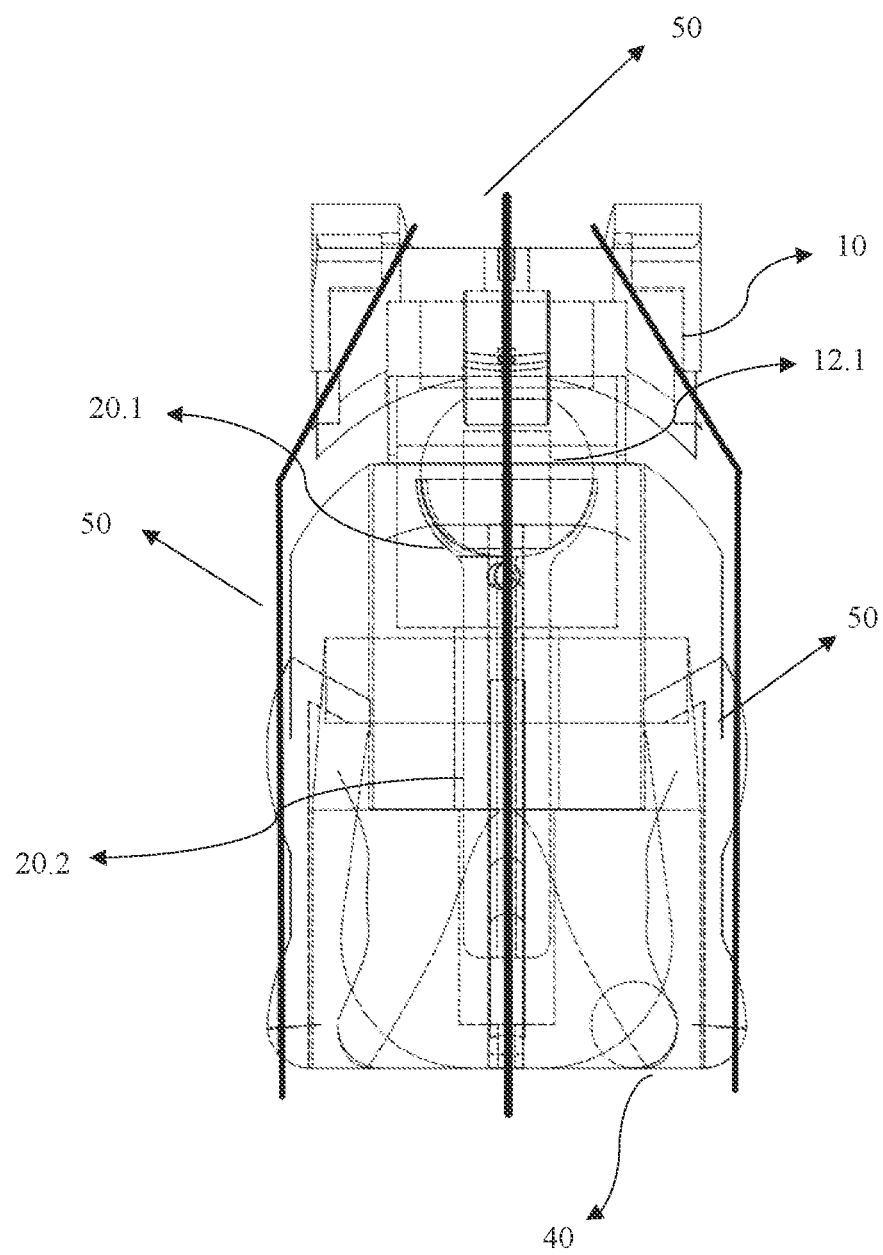
FIG. 3 is a view of the tendons and passageways on the prosthetic wrist unit.
Figure 4:
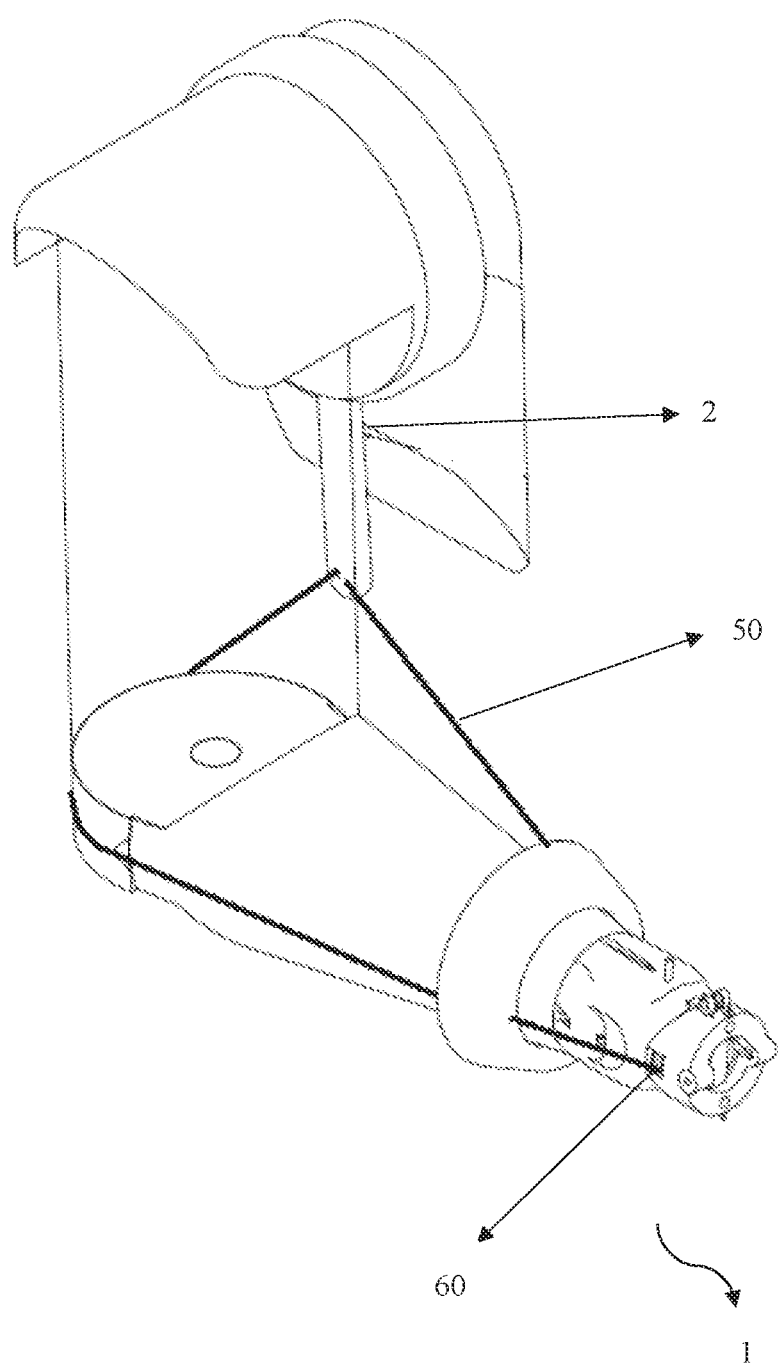
FIG. 4 is a view of the tendons and the abduction-adduction connection mechanism that controls tendons.
Figure 5:
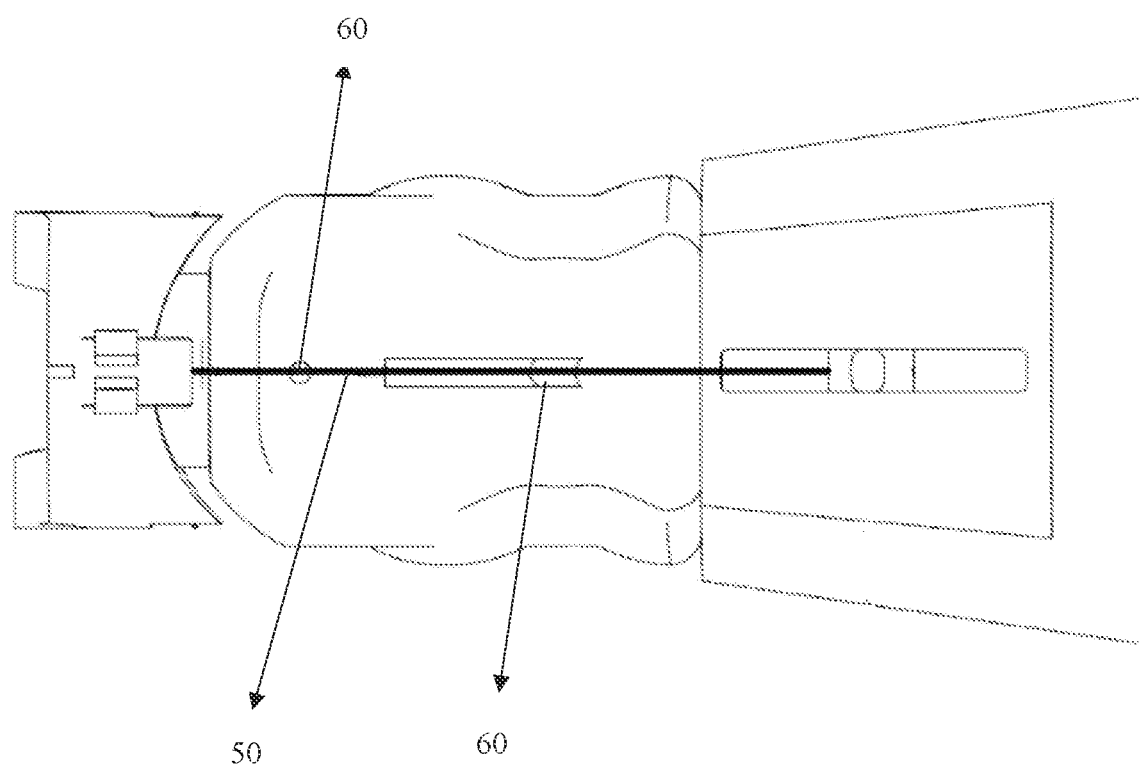
FIG. 5 is a view of the tendons and tendon slots on the prosthetic wrist unit.
Figure 6:
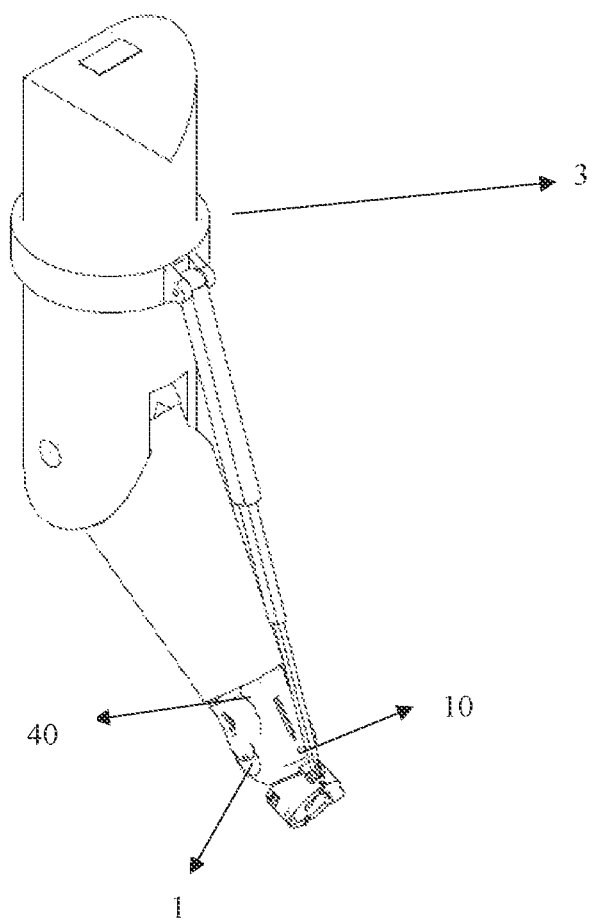
FIG. 6 is a view of the tendons and the flexion-extension connection mechanism that controls tendons.

LIST OF REFERENCES 1. prosthetic wrist unit
  10. wrist base unit
    11. front end part
      11.1 connection slot
    12. rear end part
      12.1 connecting piece
  20. joint
    20.1 joint seat
    20.2 joint body
  30. locking mechanism
    30.1. locking mechanism opening
  40. arm coupling unit
    41. front end
      41.1 arm coupling unit opening
    42. rear end
  43. lock
  50. tendon
  60. tendon slot
2. abduction-adduction connection mechanism
3. flexion-extension connection mechanism

DETAILED DESCRIPTION OF THE EMBODIMENTS

The present invention relates to a multifunctional body-supported prosthetic wrist unit (1) used with a hand mechanism to be used for individuals with congenital limb loss or amputees.

A prosthetic wrist unit (1) allows the hand mechanism to be positioned in different positions to perform a variety of daily tasks that require different ranges of motion (ROM). In order to achieve this range of motion, the prosthetic wrist unit (1) of the present invention allows similar ranges of motion in which the human hand can maintain its function.

In the preferred embodiments of the invention, the hand mechanism refers to a prosthetic hand, robotic hand, or other rehabilitation hand devices.

In the present invention, the prosthetic wrist unit (1) comprises a wrist base unit (10), at least one joint (20), at least one locking mechanism (30), an arm coupling unit (40), and at least one tendon (50).

In the present invention, a prosthetic wrist unit (1) allowing a connection between the arm and a hand mechanism comprises a wrist base unit (10) with at least one connection slot (11.1) into which the hand mechanism is to be inserted, and at least one connecting piece (12.1) enabling the rotational movement of the wrist base unit (10), wherein the connection slot (11.1) is located at a front end part (11) of the wrist base unit (10) while the connecting piece (12.1) is located at the other rear end part (12) of the wrist base unit (10); a joint (20) including a joint seat (20.1) into which the connecting piece (12.1) is inserted, and a joint body (20.2), wherein, in order for the rotational movement of the wrist base unit (10) to take place, the joint seat (20.1) is such that the connecting piece (12.1) can move therein; a locking mechanism (30) comprising a locking mechanism opening (30.1) into which the joint body (20.2) is inserted and enabling the prosthetic wrist unit (1) to operate in two positions, i.e., fixed or movable; and an arm coupling unit (40) into which the joint (20) and the locking mechanism (30) are inserted and which restricts the movement of the joint (20) and the locking mechanism (30), wherein the arm coupling unit (40) has a front end (41) having an arm coupling unit opening (41.1) into which the locking mechanism (30) is fitted, and a rear end (42) into which the arm is inserted; and at least one tendon (50) ensuring the joint stiffness of the prosthetic wrist unit (1).

In the present invention, a wrist base unit (10) is configured to provide a connection between the hand mechanism and the prosthetic wrist unit (1). The wrist base unit (10) comprises at least one connection slot (11.1) located at a front end part (11), into which the hand mechanism will be inserted, and at least one connecting piece (12.1) ensuring the rotational movement of the wrist base unit (10) and positioned on another rear end part (12) in an integral manner.

In the present invention, the joint (20) comprises a joint seat (20.1) into which the connecting piece (12.1) located on a rear end part (12) of the wrist base unit (10) is inserted, and a joint body (20.2). In order to perform circular and arcuate movements of the wrist base unit (10), the joint seat (20.1) is such that the connecting piece (12.1) can move inside the joint seat (20.1).

In an embodiment of the invention, the connecting piece (12.1) and the joint seat (20.1) should be in a form capable of providing a 2 degrees of freedom wrist movement as flexion-extension and abduction-adduction.

In an embodiment of the invention, the connecting piece (12.1) located on a rear end part (12) of the wrist base unit (10) is convex, and the joint seat (20.1) into which the said connecting piece (12.1) is inserted is concave.

In an embodiment of the invention, the joint body (20.2) preferably has a cylindrical structure.

In an embodiment of the invention, the joint seat (20.1) is in the form of a concave slot where the convex connecting piece (12.1) can move inside the joint seat (20.1).

In an embodiment of the invention, the concave joint seat (20.1) into which the convex connecting piece (12.1) is inserted has a circular structure larger than the connecting piece (12.1) in order to perform the circular and arcuate movement of the connecting piece (12.1). In an embodiment of the invention, the connecting piece (12.1) and the joint seat (20.1) can be formed in the form of a universal joint in order to provide a 2 degrees of freedom wrist movement as flexion-extension and abduction-adduction.

In an embodiment of the invention, the connecting piece (12.1) and the joint seat (20.1) can be connected by means of a dual rail connection to provide a 2 degrees of freedom wrist movement as flexion-extension and abduction-adduction.

In an embodiment of the invention, the joint seat (20.1) and the joint body (20.2) are integral. The two end parts of the joint (20) are defined separately to expose the connections.

In the present invention, the wrist base unit (10) moves within the joint (20) in 2 degrees of freedom as flexion-extension and abduction-adduction.

In the present invention, flexion-extension and abduction-adduction movements are performed as a result of an orientation of the convex connecting piece (12.1) in the concave joint seat (20.1) through the tendons.

In the present invention, the locking mechanism (30), which enables the prosthetic wrist unit (1) to operate between two modes, i.e., fixed or movable, comprises a locking mechanism opening (30.1) into which the joint body (20.2) is inserted.

In the present invention, the joint body (20.2) is inserted in the opening (30.1) of the locking mechanism and thus the locking mechanism (30) allows the prosthetic wrist unit (1) to operate between two different modes (a locked mode and a movable mode). One of these modes is the locked mode, resulting from the placement of the entire joint (20) inside the locking mechanism and ensuring the rigid stiffness of the prosthetic wrist unit (1). The other one of the said modes is the movable mode that allows the wrist base unit (10) to rotate in order to reach the required range of motion within the locking mechanism (30) by pulling the joint (20) out of the locking mechanism (30).

In the present invention, the wrist base unit (10) is switched to the locked mode once the joint (20) is completely inserted into the locking mechanism (30). By moving the said joint (20) out of the locking mechanism (30), the wrist base unit (10) is switched to movable mode. The transition of the wrist base unit (10) between the locked and movable mode, respectively, is accomplished by manually pushing the joint (20) into the locking mechanism (30) and again manually pulling the joint (20) out of the locking mechanism (30). Thus, the prosthetic wrist unit (1) stiffens to fulfill its dynamic functions, namely hammering and loading. Therefore, the arm coupling unit (40) is designed to be strong and rigid to overcome the stress caused by these tasks.

In the present invention, the arm coupling unit (40) comprises a front end (41) into which the locking mechanism (30) is fitted and a rear end (42) into which the arm is inserted. The arm coupling unit (40) comprises an arm coupling unit opening (41.1) at another front end part (41) that is not coupled with the arm. Said joint (20) and the locking mechanism (30) are fitted into the arm coupling unit opening (41.1) so that the arm coupling unit opening (41.1) limits the movement of the joint (20) and the locking mechanism (30) to lock the wrist base unit (10).

In an embodiment of the invention, the arm coupling unit (40) also comprises a one-way lock (43) positioned on its upper surface, which enables the joint (20) and the locking mechanism (30) to be locked inside the arm coupling unit opening (41.1).

In the present invention, the prosthetic wrist unit (1) also comprises at least one tendon (50) ensuring the stiffness of the prosthetic wrist unit (1).

The joint stiffness of the prosthetic wrist unit (1), being solid, softer and the softest modes, is achieved by stretching the tendons (50).

In the present invention, it comprises at least one tendon (50) to make abduction-adduction, i.e., right and left movement of the prosthetic wrist unit (1).

In the present invention, it comprises at least one tendon (50) to make flexion-extension, i.e., up and down movement of the prosthetic wrist unit (1).

In an embodiment of the invention, the wrist base unit (10) comprises at least one tendon slot (60) through which the tendon (50) is passed.

In the present invention, the wrist base unit (10) comprises four tendon slots (60), one on either side surface of the wrist base unit (10) and one on the upper and lower surfaces on the rear end part (12).

In the present invention, the arm coupling unit (40) comprises at least one tendon slot through which the tendon (50) is passed.

In the present invention, the arm coupling unit (40) comprises four tendon slots (60), one on either side surface of the arm coupling unit (40) and one on the upper and lower surfaces on the front end (41).

In an embodiment of the invention, the tendon slots can be positioned in different variations on the wrist base unit (10) and the arm coupling unit (40) so as to allow the passage of the tendons.

In an embodiment of the invention, the tendon slots (60) located on both side surfaces of the wrist base unit (10) and the tendon slots (60) located on both side surfaces of the arm coupling unit (40) are positioned in the same direction with each other; and the tendon slots (60) located on the upper and lower surfaces on the rear end part (12) and the tendon slots (60) located on the upper and lower surfaces on the front end (41) are positioned in the same direction with each other.

In a preferred embodiment of the invention, four tendons (50) are used. Two of the tendons (50) provide the stiffness of the prosthetic wrist unit (1) during flexion-extension, i.e., up and down movement. The other two tendons (50) enable the prosthetic wrist unit (1) to make abduction-adduction, i.e., the right and left movement.

In the present invention, the abduction-adduction movement of the prosthetic wrist unit (1) is performed by an abduction-adduction connection mechanism (2), which is connected to the upper elbow part of the body by means of tendons.

In the present invention, the movement of the prosthetic wrist unit (1) during flexion-extension is performed by a flexion-extension connection mechanism (3) connected to the upper elbow part of the body by means of tendons (50).

In the present invention, the joint stiffness of the prosthetic wrist unit (1), being the rigid stiffness (the hardest state), solid, softer or the softest stiffness, is manually adjusted by the connection mechanisms (2,3).

In the present invention, the adjustment of the tendon tension in the prosthetic wrist unit (1) can be automatically achieved by means of an actuator provided in the arm coupling unit (40).

In an embodiment of the invention, there is a one-way lock (43) that ensures the locking of the joint (20) and the locking mechanism (30) inside the arm coupling unit opening (41.1). In the position where the prosthetic wrist unit (1) is locked, the prosthetic wrist unit (1) is rigid. When the lock (43) is unlocked, the joint stiffness of the prosthetic wrist unit (1) is determined by the amount of tension of the tendons (50). The amount of tension of the tendons (50) allows an adjustment of the joint stiffness in the prosthetic wrist unit (1). The required setting of the stiffness is the setting in which the tendons (50) are stretched or relaxed in an amount necessary for the prosthetic wrist unit (1) to perform the desired movement.

The stiffness adjustment of the prosthetic wrist unit (1) is made manually by stretching the tendons (50). It is ensured that the prosthetic wrist unit (1) is rigid (the hardest state), solid, softer or the softest, and the amount of tension (joint stiffness) of the tendons (50) can be adjusted so that the hand prosthesis can take up different weights. By manually stretching the tendons (50), the joint stiffness of the prosthetic wrist unit (1) is increased. If the amount of tension on the tendons (50) is decreased, the joint stiffness of the prosthetic wrist unit (1) also decreases.

In a preferred embodiment of the invention, the prosthetic wrist unit (1) remains in locked mode or movable mode, which is ensured by controlling the movement of the joint (20) in the locking mechanism (30) either manually or by an actuator.

In a preferred embodiment of the invention, the connection mechanisms (2,3) that are connected to the upper elbow part of the body allow abduction-adduction and flexion-extension movements of the wrist.

What is claimed is:

1. A prosthetic wrist unit allowing a connection between an arm and a hand mechanism, comprising:
    a wrist base unit with at least one connection slot and at least one connecting piece, wherein the hand mechanism is inserted into the at least one connection slot, the at least one connecting piece enables a rotational movement of the wrist base unit, wherein the at least one connection slot is located at a front end part of the wrist base unit while the at least one connecting piece is located at a rear end part of the wrist base unit;
    a joint including a joint seat and a joint body, wherein, the at least one connecting piece is inserted in to the joint seat, in order for the rotational movement of the wrist base unit to take place, the at least one connecting piece is allowed to move in the joint seat;
    a locking mechanism comprising a locking mechanism opening, wherein the joint body is inserted into the locking mechanism opening and the locking mechanism opening enables the prosthetic wrist unit to operate in a fixed position or a movable position;
    an arm coupling unit, wherein the joint and the locking mechanism are inserted into the arm coupling unit, the arm coupling unit restricts a movement of the joint and the locking mechanism, the arm coupling unit includes a front end having an arm coupling unit opening and a rear end, wherein the locking mechanism is fitted into the arm coupling unit opening, and the arm is inserted into the rear end; and
    at least one tendon ensuring a joint stiffness of the prosthetic wrist unit;
        wherein the at least one connecting piece of the wrist base unit and the joint seat of the joint are in a form capable of providing a 2 degrees of freedom wrist movement as flexion-extension and abduction-adduction.

2. The prosthetic wrist unit according to claim 1, wherein the wrist base unit comprises a convex connecting piece.

3. The prosthetic wrist unit according to claim 2, wherein the arm coupling unit also comprises a lock, wherein the lock enables the joint and the locking mechanism to be locked inside the arm coupling unit opening.

4. The prosthetic wrist unit according to claim 2, wherein the joint comprises a concave joint seat.

5. The prosthetic wrist unit according to claim 4, wherein the arm coupling unit also comprises a lock, wherein the lock enables the joint and the locking mechanism to be locked inside the arm coupling unit opening.

6. The prosthetic wrist unit according to claim 4, wherein the convex connecting piece is inserted into the concave joint seat, and the concave joint seat has a circular structure larger than the convex connecting piece in order to perform a circular and arcuate movement of the convex connecting piece.

7. The prosthetic wrist unit according to claim 6, wherein the arm coupling unit also comprises a lock, wherein the lock enables the joint and the locking mechanism to be locked inside the arm coupling unit opening.

8. The prosthetic wrist unit according to claim 1, wherein the arm coupling unit also comprises a lock, wherein the lock enables the joint and the locking mechanism to be locked inside the arm coupling unit opening.

9. The prosthetic wrist unit according to claim 1, wherein the wrist base unit comprises at least one tendon slot, and the at least one tendon is passed through the at least one tendon slot.

10. The prosthetic wrist unit according to claim 9, wherein the wrist base unit comprises four tendon slots, wherein a first tendon slot is provided on a side surface of the wrist base unit and a second tendon slot is provided on upper and lower surfaces on the rear end part.

11. The prosthetic wrist unit according to claim 1, wherein the arm coupling unit comprises at least one tendon slot, and the at least one tendon is passed through the at least one tendon slot.

12. The prosthetic wrist unit according to claim 11, wherein the arm coupling unit comprises four tendon slots, wherein a first tendon slot is provided on a side surface of the arm coupling unit and a second tendon slot is provided on upper and lower surfaces on the front end.

13. The prosthetic wrist unit according to claim 1, wherein an amount of stiffness in the joint stiffness of the prosthetic wrist unit is adjusted by the at least one tendon.

14. The prosthetic wrist unit according to claim 1, further comprising an abduction-adduction connection mechanism connected to an upper elbow part of a body, the abduction-adduction connection mechanism allows an abduction-adduction movement of the prosthetic wrist unit to be performed by the at least one tendon.

15. The prosthetic wrist unit according to claim 1, further comprising a flexion-extension connection mechanism connected to an upper elbow part of a body, the flexion-extension connection mechanism allows an abduction-adduction movement of the prosthetic wrist unit to be performed.

16. The prosthetic wrist unit claim 1, wherein an amount of tension of the at least one tendon configured to adjust a rigidity in the joint stiffness of the prosthetic wrist unit is adjusted manually.

17. The prosthetic wrist unit according to claim 1, further comprising at least one actuator positioned within the arm coupling unit, wherein the at least one actuator automatically adjusts an amount of tension on the at least one tendon.

* * * * *